United States Patent [19]

Onodera et al.

[11] Patent Number: 5,996,026
[45] Date of Patent: Nov. 30, 1999

[54] METHOD AND APPARATUS FOR CONNECTING I/O CHANNELS BETWEEN SUB-CHANNELS AND DEVICES THROUGH VIRTUAL MACHINES CONTROLLED BY A HYPERVISOR USING ID AND CONFIGURATION INFORMATION

[75] Inventors: Osamu Onodera; Makiko Shinohara; Kiichi Sato, all of Hadano, Japan

[73] Assignee: Hitachi, Ltd., Tokyo, Japan

[21] Appl. No.: 08/833,349

[22] Filed: Apr. 4, 1997

Related U.S. Application Data

[63] Continuation-in-part of application No. 08/670,316, Sep. 5, 1996, Pat. No. 5,845,146.

[30] Foreign Application Priority Data

Sep. 5, 1995 [JP] Japan .................................... 7-227724
Apr. 8, 1996 [JP] Japan .................................... 8-084919

[51] Int. Cl.⁶ .............................. G06F 7/04; G06F 9/00
[52] U.S. Cl. ........................ 710/3; 710/2; 710/1; 710/5; 710/8; 707/1; 709/104
[58] Field of Search ................................... 395/674, 856, 395/821, 828, 825, 735, 726, 830, 406; 707/1; 710/2, 3, 5, 8, 100, 200; 709/104

[56] References Cited

U.S. PATENT DOCUMENTS

| | | | |
|---|---|---|---|
| 4,843,541 | 6/1989 | Bean et al. ................................ | 395/856 |
| 4,885,681 | 12/1989 | Umeno et al. ........................... | 395/406 |
| 5,109,489 | 4/1992 | Umeno et al. ........................... | 395/856 |
| 5,146,565 | 9/1992 | Blanck et al. ............................ | 395/856 |
| 5,253,344 | 10/1993 | Bostick et al. ........................... | 395/828 |
| 5,257,353 | 10/1993 | Blanck et al. ............................ | 395/856 |
| 5,392,409 | 2/1995 | Umeno et al. ........................... | 395/406 |
| 5,414,851 | 5/1995 | Brice, Jr. et al. ....................... | 395/674 |
| 5,452,455 | 9/1995 | Brown et al. ............................ | 395/653 |
| 5,506,975 | 4/1996 | Onodera .................................. | 395/406 |
| 5,600,805 | 2/1997 | Fredericks et al. .................... | 395/825 |
| 5,659,756 | 8/1997 | Hefferon et al. ........................ | 395/726 |
| 5,659,786 | 8/1997 | George et al. ........................... | 395/653 |

Primary Examiner—Ahmad F. Matar
Assistant Examiner—William D Thomson
Attorney, Agent, or Firm—Antonelli, Terry, Stout & Kraus, LLP

[57] ABSTRACT

A connection method of a plurality of input/output channels between a plurality of sub-channels of an information processing system having a virtual machine running on a physical machine under control of a hypervisor and a plurality of devices. The method includes issuing from the hypervisor a command for setting configuration information defining a plurality of configuration structures between the sub-channels set for the respective virtual machines and the devices in a storage device and acquiring configuration information containing the sub-channel corresponding to a designated device from the configuration information corresponding to one of the virtual machines based on the device designation contained in the input/output command from the one virtual machine. The virtual machines are enabled after the issuance of the set command and before the issuance of the input/output command. The corresponding configuration information is searched by using ID information of the virtual machine which issued the input/output command in order to execute the step so that one of a plurality of channel paths between a plurality of devices and the sub-channels is selected to execute the input/output designated by the input/output command.

14 Claims, 3 Drawing Sheets

| ITEM NUMBER | LPAR IDENTIFIER | INPUT / OUTPUT CONFIGURATION INFORMATION ID |
|---|---|---|
| 1 | 1 | 0 |
| 2 | 2 | 1 |

METHOD AND APPARATUS FOR CONNECTING I/O CHANNELS BETWEEN SUB-CHANNELS AND DEVICES THROUGH VIRTUAL MACHINES CONTROLLED BY A HYPERVISOR USING ID AND CONFIGURATION INFORMATION

CROSS REFERENCE TO RELATED APPLICATIONS

The present application is a continuation-in-part of U.S. patent application Ser. No. 08/670,316 entitled "EXTENDING SYSTEM OF INPUT/OUTPUT CHANNEL" filed by O. Onodera filed on Sep. 5, 1996, now U.S. Pat. No. 5,845,146, the contents of the disclosure of which are incorporated herein by reference.

BACKGROUND OF THE INVENTION

The present invention relates to an extending method of an input/output channel of an information processing system, and more particularly to an extending method of an input/output channel in an information processing system in which a plurality of virtual machines operates on a physical machine.

As a common method for operating a plurality of operating systems (hereinafter referred to as OSs) on a single information processing system, a technique called a virtual machine or logical partition (hereinafter referred to as a VM or LPAR) has been known. In this technique, a control program called a virtual machine control program (hereinafter referred to as a hypervisor) is operated on a physical machine, a plurality of LPARs are generated under control of the hypervisor and independent OSs are operated on the respective LPARS. In order to operated the plurality of LPARs on the single physical information processing system (physical machine), the hypervisor is provided with a function to allow the respective LPARs to share hardware resources of the physical information processing system. A method for allowing the respective LPARs to share the hardware resources includes a method for allocating the hardware resources in time-division fashion under control of the hypervisor, a method fore logically dividing the hardware resources and exclusively allocating them to the respective LPARs, and a method for allocating by the mixture of the above two methods.

On the other hand, as a prior art method of an input/output method of the information processing system, an extended channel system (hereinafter referred to as an ECS) has been known. In the ECS, a plurality of sub-channels which one-to-one correspond to a plurality of input/output devices are provided, transfer paths of output commands and data due to input/output operations between the sub-channels and the input/output devices are determined through a channel path selection circuit and the transfer paths are determined without intervention of a program which starts the input/output operations. Each sub-channel holds input/output configuration information containing an input/output number of the corresponding input/output channel and a physical channel path number to which the input/output device is connected, and initial information of the input/output configuration information of the sub-channel is stored in a memory of a service processor (hereinafter referred to as a SVP). In an initialization process of the information processing system, the input/output configuration information in the memory of the SVP is loaded in a hardware system area (hereinafter referred to as HSA) to which a user program in a main storage cannot access and it is used to control the input/output operations.

When the input/output operation in a virtual machine system is conducted under control of the ECS, a plurality of sub-channels are generated for one input/output device, and the input/output device and the sub-channels are controlled to correspond one-to-one for each of the plurality of LPARs. In this case, each sub-channel corresponding to one input/output device has an LPAR identification ID corresponding to a virtual machine ID and one of the input/output configuration information.

A maximum number of input/output channels (number of CHPs) of the extended channel system is determined by a hardware architecture of the physical information processing system, that is, a designated data length of the CHP defined in the input/output configuration information. For example, when the designated data length of the CHP of the input/output configuration information is 8 bits, the maximum number of input/output channels is 256 channels.

Accordingly, when two systems of the LPARs which are the virtual machines in the prior art are constructed and the physical input/output processors are logically divided and they are allocated to an LPAR1 and an LPAR2, an upper limit of a total number of input/output channels (total number of CHPs) of the number of input/output channels is restricted by the maximum number of input/output channels determined by the hardware architecture having the number of input/output channels mounted as the physical input/output processors. For example, when the designated data length of the CHP in the input/output configuration information determined by the hardware architecture of the physical information processing system is 8 bits, the maximum total number of input/output channels which may be designated in the LPAR1 and the LPAR2 is 256 channels.

Accordingly, in the prior art method of logically dividing the physical input/output processors and the input/output channels (CHPs) and allocating them to the respective LPARs, it is not possible to conduct the input/output operations by using the number of CHPs which exceeds the maximum number of input/output channels determined by the hardware architecture.

SUMMARY OF THE INVENTION

It is an object of the present invention to provide a connection method of extended input/output channels which suppresses significant increase of hardware logics of an information processing system under a predetermined data width of a channel path ID determined by a hardware architecture designated by a CHP of a predetermined physical information processing system while maintaining compatibility with a program operating on an LPAR.

A connection method of a plurality of input/output channels between a plurality of sub-channels of an information processing system having a virtual machine running on a physical machine under control of hypervisor and a plurality of devices, in accordance with the present invention includes the steps of issuing from the hypervisor a command for setting configuration information defining a plurality of configuration structures between the sub-channels set for the respective virtual machines and the devices in the main storage and acquiring configuration information containing the sub-channel corresponding to a designated device from the configuration information corresponding to one of the virtual machines based on the device designation contained in the input/output command from said one virtual machine. The virtual machines are enabled after the issuance of the set command and before the issuance of the input/output command.

In accordance with the present invention, in a physical information processing system having a central processor, a main storage, input/output channels, an input/output control unit for controlling the input/output channels, input/output devices connected to the input/output channels and a service processor for operating a plurality of virtual machines under control of a virtual machine control program, a plurality of input/output configuration information which relates the input/output channels to the respective attached input/output devices are held in the main storage. A plurality of channel systems comprising different input/output channels and input/output processors for controlling the input/output channels are constructed for each of the plurality of input/output configuration information, and the respective input/output channels of the plurality of channel systems may be concurrently enabled from a plurality of virtual machines while relating the input/output configuration information to the respective virtual machines.

Specifically, the service processor has a storage for holding a plurality of input/output configuration information which relate the input/output channels to the attached input/output devices and defines a maximum number of channel path IDs determined by a basic hardware architecture of the information processing system for each of the plurality of input/output configuration information. A plurality of channel systems which relate different channel systems to the respective ones of the plurality of input/output configuration information are provided. The plurality of virtual machines have virtual machine IDs which are identifiers of the respective virtual machines, and the plurality of input/output configuration information have input/output configuration information IDs which are identifiers of the respective input/output configuration information.

In the initialization process of the information processing system, the plurality of input/output configuration information in the memory of the service processor are loaded to a hardware system area in a main storage. The hardware system area includes an input/output configuration information area for storing the loaded input/output configuration information as well as an input/output configuration information ID storage area for relating the virtual machine IDs which are identifiers of the virtual machines to the input/output configuration information IDs which are identifiers of the respective input/output configuration information, and an input/output configuration area address storage area corresponding to the respective input/output information IDs.

When the virtual machine issues an input/output process request containing a virtual machine ID and a channel path ID, the corresponding input/output configuration information ID is read based on the virtual machine ID, the intended input/output configuration information area address in the input/output configuration information area address storage area is read by using the input/output configuration information ID, and the input/output configuration area is referred by using the read input/output configuration information area address to specify the intended input/output configuration information. By using the specified input/output configuration information, the input/output configuration information ID and the channel path ID, one of the plurality of channel systems is selected and one of the plurality of input/output devices connected to the selected channel system is selected for access.

As a response of the input/output device to the access, the input/output configuration information ID and the channel path ID are sent back. Based on the input/output configuration information ID and the channel path ID as the response from the input/output device, the input/output configuration information ID storage area corresponding to the input/output device number is accessed, the virtual machine ID corresponding to the input/output configuration information ID is read, the virtual machine corresponding to the read virtual machine ID is selected and a response is made in accordance with the channel path ID for the virtual machine.

The virtual machine control program issues a command which allows the accessing to the hardware system area in the main storage to change the contents of the input/output configuration information ID area, the input/output configuration information area address storage area and the input/output configuration information area so that the relation between the virtual machine IDs and the input/output configuration information IDs may be changed and the input/output device configuration may be changed.

By the above arrangement, the correspondence between the virtual machine IDs which are the identifiers of the respective virtual machines and the input/output configuration information IDs may be attained and a maximum number of input/output channels determined by the basic hardware architecture of the physical information processing system may be used in each of the plurality of virtual machines (LPARs). As a result, the overall information processing system may concurrently access from the plurality of LPARs a number of input/output channels which exceeds the maximum number of input/output channels determined by the basic hardware architecture of the information processing system. Further, the compatibility of the program operating on the LPARs is maintained and the addition of the data width of the channel path ID determined by the hardware architecture of the information processing system is not necessary.

DETAILED DESCRIPTION OF THE PREFERRED EMBODIMENTS

Figure 1:
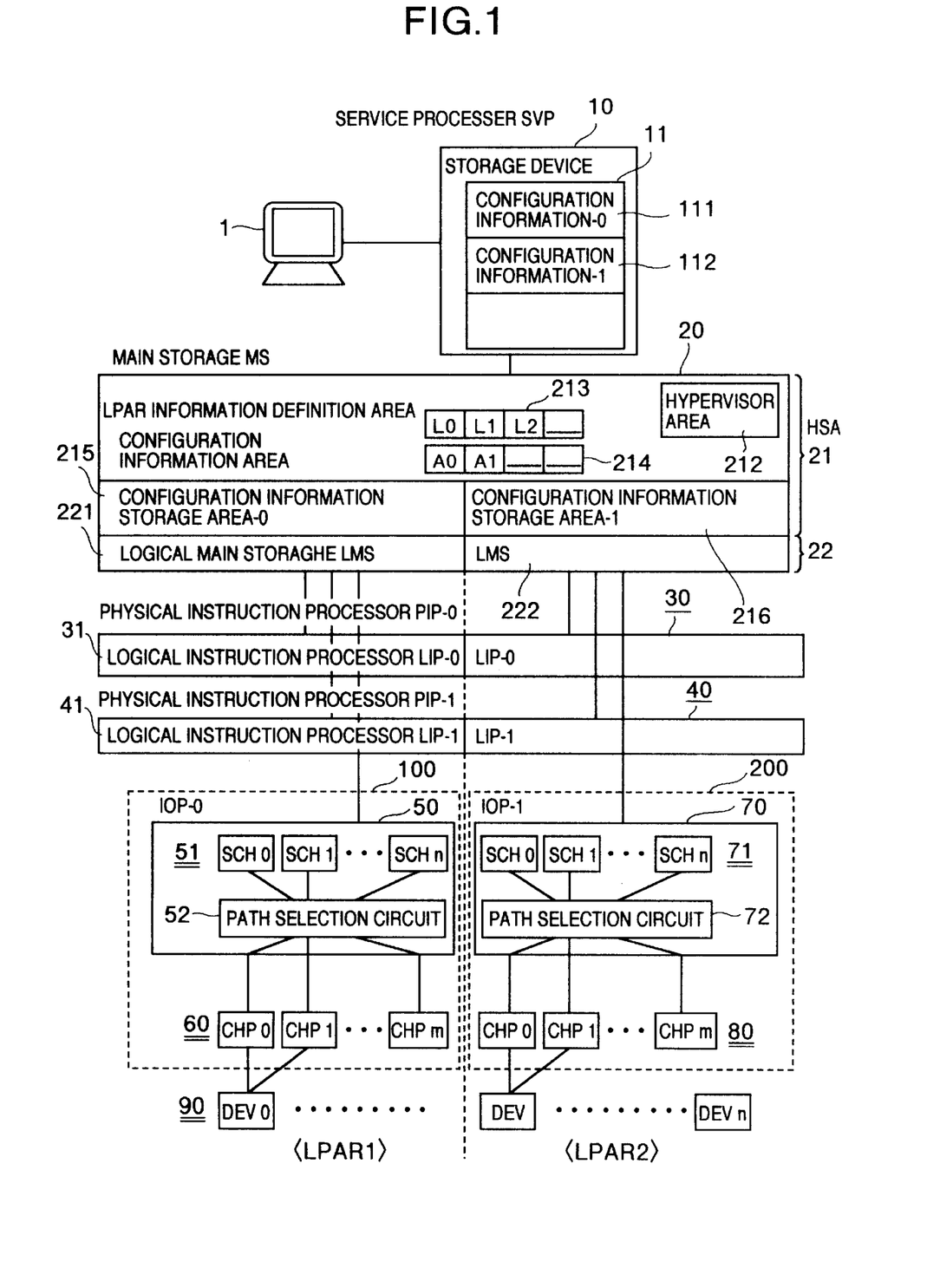
FIG. 1 shows a block diagram of a concept of a configuration of a virtual machine system to which an input/output channel extending method of the present invention is applied.

FIG. 1 shows a concept of a configuration of a virtual machine system in accordance with an embodiment to which an input/output channel extending method of the present invention is applied. It comprises a service processor (SVP) 10, a physical main storage (hereinafter referred to as an MS) 20, two physical instruction processors (hereinafter referred to as PIPS) 30 and 40 and two physical input/output processors (hereinafter referred to as IOPs) 50 and 70. A plurality of input/output channels (which are also called channel paths and hereinafter referred to as CHPs) 60 and 80 are connected to the IOP 50 and the IOP 70, respectively, and a plurality of .input/output devices (hereinafter referred to as DEVs) 90 are connected to the CHPs 60 and 80. Input/output operations issued by the PIPs 30 and 40 are independently executed by the respective CHPs through the IOPs 50 and 70 to control the exchange of data between the MS 20 and the DEVs 90.

The IOPs 50 and 70 have sub-channels (hereinafter referred to as SCHs) 51 and 71, respectively, which one-to-one correspond to the DEVs 90 and path selection circuits 52 and 72, respectively, for selecting a CHP to be used from the CHPs 60 and 80 connected to the DEVs 90. Each SCH holds input/output configuration information containing a device number of the corresponding DEV and a channel path number of the CHP to which the DEV is connected. The IOPs 50 and 70 and the CHPs 60 and 80 are collectively called a channel system.

The MS 20 comprises a hardware system area (HSA) 21 which is used by hardware and cannot be accessed from a user program and a program area 22 which may be accessed by the user program. The HAS 21 has a configuration information storage area-0 215 and a configuration information storage area-1 216 in which the input/output configuration information held by each SCH is stored, and when the system is started up, the SVP 10 loads the input/output configuration information held in a storage 11 of the SvP 10 onto the HSA 21 for use in an input/output operation as an initial value of the input/output configuration information of each SCH. The configuration information storage area-0 215 and configuration information storage area-1 216 are addressed by an entry of the configuration information area 214 in the HSA 21.

In FIG. 1, two systems of LPARs (hereinafter referred to as LPAR1 and LPAR2) which are virtual machines comprising two logical main storages (hereinafter referred to as LMSs) and four logical instruction processors (hereinafter referred to as LIPS) are constructed. In addition to the configuration information storage area-0 215 and the configuration information storage area-1 216, a hypervisor area 212 to be used by a hypervisor is provide in the HSA 21 of the MS 20.

The hypervisor runs on the two PIPs 30 and 40 and the LPAR1 and the LPAR2 operate independently from each other under control of the hypervisor. The process functions of the LIPs belonging to the LPAR1 and the LPAR2, respectively, are attained by allocating the hardware resources of the two PIPs 30 and 40 in a time division fashion under control of the hypervisor. In FIG. 1, the two LIP0 and LIP1 are allocated to the LPAR1, and the two LIP0 and LIP1 are allocated to the LPAR2. The storage functions of the LMSs belonging to the respective LPAR1 and the LPAR2 are attained by logically dividing the program area 22 of the MS 20 and exclusively allocating them to the respective LPARs under control of the hypervisor, or by logically dividing the virtual storage area created in the program area 22 on the MS 20 and exclusively allocating them to the respective LPARs. In FIG. 1, one LMS is allocated to the LPAR1 and another LMS is allocated to the LPAR2 and the respective LPARs are exclusively used. The input/output operation functions belonging to the respective LPAR1 and the LPAR2 are attained by logically dividing the SCHs and the CHPs connected to the IOP 50 and the IOP 70 and exclusively allocating them to the respective LPARs under control of the hypervisor.

The maximum number of input/output channels (the number of CHPS) of the IOP 50 of the channel system 100 is determined by the hardware architecture of the physical information processing system, that is, the data length designating the CHP defined in the input/output configuration information. For example, when the designated data length of the CHP in the input/output configuration information is 8 bits, the maximum number of input/output channels of the IOP 50 is 256 channels.

The maximum number of input/output channels (the number of CHPs) of the channel system 200 is also 256 channels.

In FIG. 1, the SVP 10 contains a storage device 11 therein, and a plurality of input/output configuration information determined by the basic hardware architecture of the physical information processing system are held in the storage device 11. In the present embodiment, two information, input/output configuration information-0 111 and input/output configuration information-1 112 are held. The SVP 10 is connected to an operator console and an operator terminal 1 of an operator panel through signal lines to control the manipulation of the physical information processing system. The SVP 10 is further connected to the physical information processing system through a signal line to allow the communication with the units of the physical information processing system.

The physical information processing system which is a bare machine of the information processing system shown in FIG. 1 comprises one MS 20, two PIPS, PIP0 30 and PIP1 40, two IOPs, IOP0 50 and IOP1 70, CHPs 60 and 80 each including a plurality of CHPs and connected to the IOP 50 and the IOP 70, respectively, and DEVs 90 connected to the CHPs 60 and 80.

The IOP0 50 comprises SCHs 51 comprising a plurality of S3CHs one-to-one corresponding to the respective DEVs 90 and a path selection circuit 52 for selecting one of the CHPs 60 connected to the DEVs 90. Similarly, the IOP1 70 comprises SCHs 71 comprising a plurality of S;CHs one-to-one corresponding to the respective DEVs 90 and a path selection circuit 72 for selecting one of the CHPs 60 connected to the DEVs 90. The IOP0 50 and the CHPs 60 form a first channel system 100 and the IOP1 70 and the CHPs 80 form s second channel system 200, and the channel systems 100 and 200 are related to the input/output configuration information-0 111 and the input/output configuration information-1 112, respectively.

In the embodiment of FIG. 1, a virtual machine system comprising the LPAR1 and the LPAR2 is constructed on the physical information processing system. The PIP-0 30 is divided into a LIP-0 31 and a LIP-0 32 which are allocated to the LPAR1 and the LPAR2, respectively. Similarly, the PIP-1 40 is divided into a LIP-1 41 and a LIP-1 42 which are allocated to the LPAR1 and the LPAR2, respectively. Of the two IOPs 50 and 70 of the channel systems 100 and 200, the IOP-0 50 is allocated to the LPAR1 and a plurality of DEVs allocated to the LPAR1 are connected to the SCHs 51 in the IOP-0 50 through the CHPs 60 by the path selection circuit 52. Further, the IOP-1 70 is allocated to the LPAR2 and a plurality of DEVs allocated to the LPAR2 are connected to the SCHs 71 in the IOP-1 70 through the CHPs 80 by the path selection circuit 72.

The MS 20 comprises an HSA 21 used by the hardware and not accessible from a user program and a program area :72 usable by the user program. Of those, the program area 22 is divided into n LMS 221 and an LMS 222 which are allocated to the LPAR1 and the LPAR2, respectively. The HAS 21 comprises a hypervisor area 212 in which the hypervisor is stored, an input/output configuration information storage area-0 215 and an input/output configuration information storage area-1 216 in which the input/output configuration information 111 and 112 on the storage device 11 of the SVP 10 are stored, an input/output configuration information area 214 for storing addresses of the input/output configuration information storage area-0 215 and the input/output configuration information storage area-1 216 and an LPAR information definition area for storing information definition which correspond to the virtual machine IDs of the plurality of LPARs (the LPAR-1 and the LPAR-2) controlled by the hypervisor and the input/output configuration information IDs of the plurality of input/output configuration information (the configuration information-0 and the configuration information-1). The input/output configuration information will be sent to and stored in the IOPs 50 and 70.

The logical configuration of the virtual machine system in accordance with one embodiment of the present invention has thus been described. If the CHP designated data length of the input/output configuration information 111 and 112 determined by the basic hardware architecture of the physical information processing system is 8 bits, the maximum number of input/output channels of the CHPs of the channel system 100 corresponding to one of the input/output configuration information 111 and 112 is 256 channels, and the maximum number of input/output channels of the CHPs of the channel system 200 corresponding to the other of the input/output configuration information 111 and 112 is also 256 channels. Accordingly, the maximum number of input/output channels defined by the basic hardware architecture of the physical information processing system, that is, 256 channels may be used by each of the LPAR1 and the LPAR2. As a result, in the overall virtual machine system comprising the LPAR1 and the LPAR2, the twice of the maximum number of input/output channels of 256 determined by the basic hardware architecture of the information processing system, that is, 512 channels may be concurrently enabled from the LPAR1 and the LPAR2.

An example of a procedure to load the input/output configuration information 111 and 112 stored in the storage device 11 of the SVP 10 into the input/output configuration information areas 215 and 216 in the HSA 21 of the MS 20 is now explained.

Prior to the start-up of the system, an operator uses the operator console and the operator terminal 1 of the console panel to select the input/output configuration information-0 111 and the input/output cc-1 112 having different input/output configuration information from the plurality of input/output configuration information held in the storage device 11 of the SVP 10. When the SVP 10 is designated the above operation, it loads the input/output configuration information-0 111 and the input/output configuration information-1 112 selected and designated by the operator into the work area in the MS 20, and when the loading is completed, it loads the input/output configuration information-0 111 and the input/output configuration information-1 112 into the input/output configuration information storage area-0 215 and the input/output configuration information storage area-1 216, respectively.

After the completion of the load of the input/output configuration information 111 and 112 into the HSA 21, the addresses of the input/output configuration information storage area-0 215 and the input/output configuration information steerage area-1 216 which are the storage destination locations of the input/output configuration information 111 and 112, are registered in entries A0 and A1 of the input/output configuration information area 214 in the HSA 21, respectively.

Figure 3:
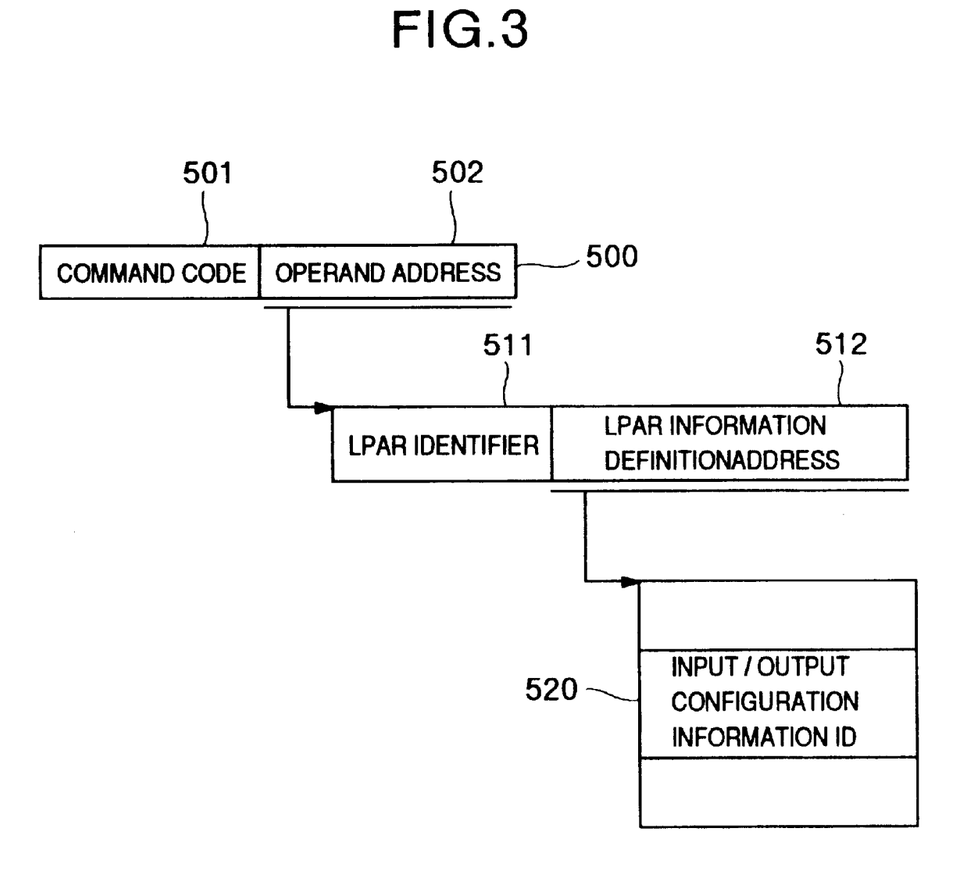
FIG. 3 shows a command for storing information definition which relates a plurality of virtual machine IDs to an input/output configuration information ID, in an LPAR information definition storage area in accordance with the present invention.
Figure 4:
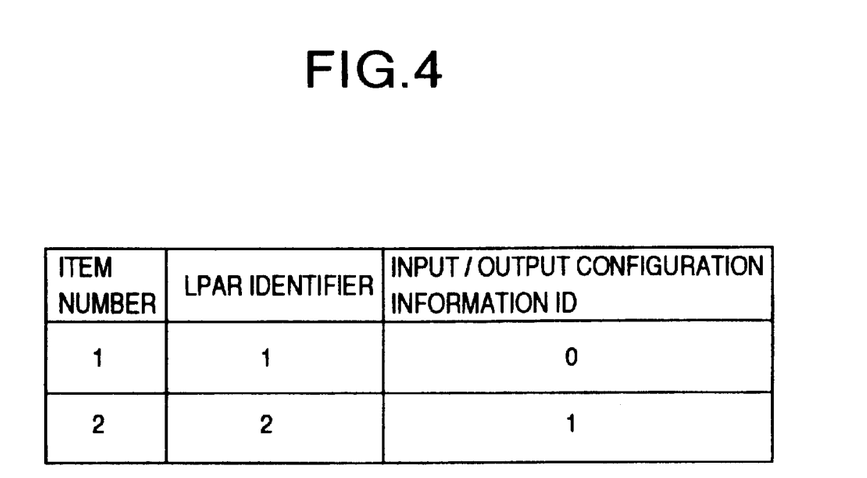
FIG. 4 shows correspondence between a virtual machine ID and an input/output configuration information ID derived by executing the command shown in FIG. 3.

The generation procedure of the LPAR information definition stored in the LPAR information definition area 213 in which the information definition which relates the virtual machine IDs or the LPAR IDs of a plurality of IJPARs (LPAR1 and LPAR2) controlled by the hypervisor to the input/output configuration information IDs are held is stored is now explained with reference to FIGS. 3 and 4, FIG. 3 shows a command to store the LPAR information definition in the LPAR information definition area which holds the information definition which relates the virtual machine IDs of the plurality of LPARs (LPAR1 and LPAR2) to the input/output configuration information IDs of the plurality of input/output configuration information (configuration information-0 and configuration information-1) when the input/output channel extending method of the present invention is applied, and FIG. 4 shows a result obtained by the execution of the command.

Before the hypervisor which is a virtual machine control program operating in the hypervisor area 212 of the HSA 21 in the MS 20 enables the respective LPARs (LPAR1 and LPAR2), it issues a command 50 having a format shown in FIG. 3. The command 500 comprises a command field 501 and an operand address field 502, and an operand 510 located at an address designated by the operand address field 502 comprises a field 511 in which the LPAR identifier (virtual machine ID) is stored and an LPAR information definition address field 512 for designating an address of a list 520 in which the input/output configuration information IDs corresponding to the respective LPARs are stored.

Before the hypervisor operating in the hypervisor area 212 of the HSA 21 enables the LPAR1, it issues the command 500 having the format shown in FIG. 3 with the LPAR identifier 511 which is the operand 510 of the command being set to "1" to correspond to the LPAR1 and the input/output configuration information ID entry corresponding to the input/output configuration information ID storage list 520 designated by the LPAR information definition address field 512 being set to "0" to correspond to the input/output configuration information-0 111. At this time, the PIP-0 30 or the PIP-0 40 on which the hypervisor which issued the command 500 runs sets the LPAR identifier "1" indicated by the item number 1 of the table of FIG. 4 and the LPAR information definition of the input/output configuration information ID "0"in the entry corresponding to the LPAR1 of the LPAR information definition area 213 of the HSA 21. Similarly, for the LPAR2, before the hypervisor operating in the hypervisor area 212 of the HSA 21 enables the LPAR2, it issues the command 500 having the format shown in FIG. 3 with the LPAR identifier 511 which is the operand 510 of the command being set to "2" to correspond to the LPAR2 and the input/output configuration information ID entry corresponding to the input/output configuration information ID storage list 520 designated by the LPAR input/output configuration information address field 512 being set to "1" to correspond to the input/output configuration information-1 512 so that the PIP-0 30 or the PIP-1 40 on which the hypervisor which issued the command runs sets the LPAR identifier indicated by the item number 2 in the table of FIG. 4 and the LPAR information definition of the input/output configuration information ID "1" in the entry corresponding to the LPAR2 of the LPAR information definition storage area 213 of the HSA 21.

When the hypervisor enables the LPAR3 in addition to the LPAR1 and the LPAR2, the LPAR identifier "3" of the LPAR3 and the input/output configuration information ID "0" or "1" of the input/output configuration information-0 111 or the input/output configuration information-1 112 corresponding to the LPAR3 are set in the entry corresponding to the LPAR3 of the LPAR information definition area 213. In this case, the LPAR1, the LPAR2 and the LPAR3 may collectively enables the twice (for example, 512 channels) of the maximum number of input/output channels (for example, 256 channels) determined by the basic hardware architectures of the input/output configuration information-0 111 and the input/output configuration information-1 112. In general, the number of input/output channels which exceeds the maximum number of input/output channels determined by the basic hardware architecture of the information processing system may be enabled from the plurality of LPARs.

Since the hypervisor issues the command of FIG. 3 to change the relation of the input/output configuration information IDs and the LPAR identifiers, a plurality of L.PARs may be dynamically related to different channel systems.

Figure 2:
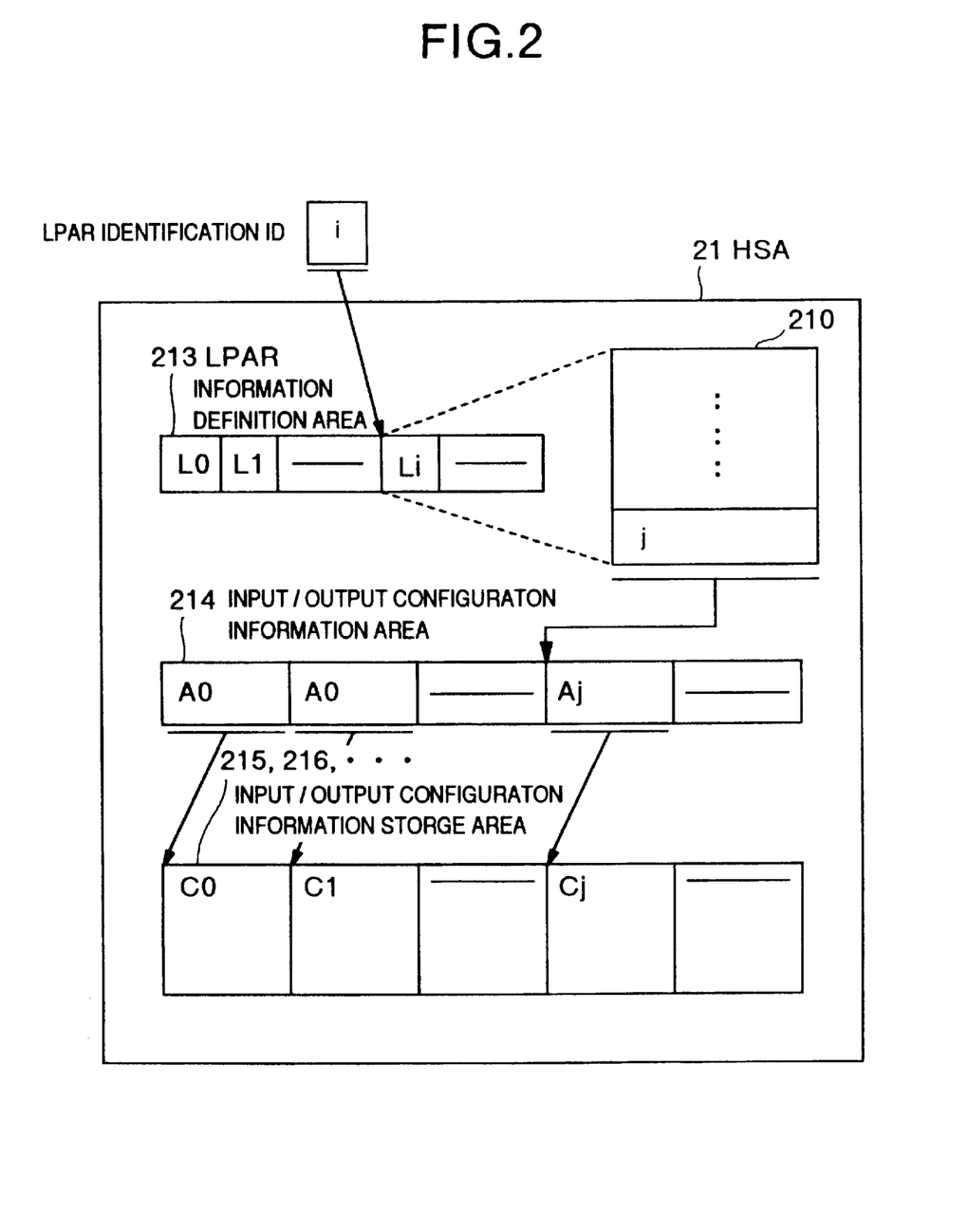
FIG. 2 shows a reference procedure in an HSA when an LPAR issues an input/output process request with an LPAR ID.

Referring to FIG. 2, a selection procedure of the input/output channel when one LPAR issues the input/output process request is explained. FIG. 4 shows a reference procedure of a predetermined area in the HSA 21 when the input/output process request is issued.

When one LPAR issues the input/output process request, the value "i" of the LPAR identifier which is the virtual machine ID allocated to that LPAR is sent with the input/output process request and an entry Li which is the i-th entry of the LPAR information definition area 213 is referred by using the value "i" of the LPAR identifier. The entry Li of the area 213 comprises a plurality of entries for storing a plurality of LPAR information definition relating to that LPAR, and a value "j" to point the corresponding entry of the input/output configuration information area 214 is set in one of the entries, that is, the configuration information identifier entry 210. An entry Aj which is the j-th entry of the input/output configuration information area 214 is referred by using the value "j" of the configuration information identifier entry to derive the content of the entry Aj. The content of the entry Aj of the input/output configuration information area 214 holds the address of the entry Cj which is the j-th entry of the input/output configuration information storage area. Accordingly, the entry Cj which is the j-th entry of the input/output configuration information storage area is referred to derive the input/output configuration information related to the LPAR which issued the input/output process request.

The procedures described above are explained in detail in conjunction with the embodiment shown in FIGS. 1 and 4.

When the LPAR1 issues the input/output process request, the value "1" of the LPAR identifier which is the virtual machine ID allocated to that LPAR is sent with the input/output process request and the entry L0 which is the first entry of the LPAR information definition area 213 is referred by using the value "1" of the LPAR identifier. The value "0" to point the corresponding entry of the input/output configuration information area 214 is set in the entry L0 of the area 213. The entry A0 which is the first entry of the input/output configuration information area 214 is referred by using the value "0" of the input/output configuration information ID to derive the content of the entry A0. The content of the entry A0 of the area 214 holds the address of the first entry C0 of the input/output configuration information storage area, that is, the address of the input/output configuration information storage area-0 215.

Then, the input/output configuration information storage area-0 215 is referred by the content of the entry A0 of the area 214. The identifier of the channel system corresponding to the input/output configuration information-0 is then derived. Assuming that the identifier of the channel system is "0", the input/output process request is sent to the channel system 100.

The channel system 100 which controls the IOP-0 50 sends the sub-channel number designated by the LPAR1 and the address of the input/output configuration information storage area-0 215 to the IOP-0 50. The IOP-0 50 reads the input/output configuration information of the designated sub-channel from the input/output configuration information storage area-0 215, extracts one or more channel path IDs from the read input/output configuration information of the sub-channel and passes the extracted channel path ID to the path selection circuit 52. The path selection circuit 52 of the IOP-50 selects the available CHP by using the passed channel path ID, determines the path to one of the plurality of DEVs through the CHP belonging to the selected IOP-0 50, and starts the DEV to start the input/output operation for the intended DEV.

Similarly, when the LPAR2 issues the input/output process request, the value "2" of the LPAR identifier which is the virtual machine ID allocated to that LPAR is sent with the input/output process request and the entry L1 which is the second entry of the LPAR information definition area 213 is referred by using the value "2" of the LPAR identifier. The value "1" to point the corresponding entry of the input/output configuration information area 214 is set in the entry L1 of the area 213. The entry A1 which is the second entry of the area 214 is referred by using the value "1" of the input/output configuration information ID entry to derive the content of the entry A1. The content of the entry A1 of the area 214 holds the address of the input/output configuration information storage area 216.

The input/output configuration information storage area-1 216 is referred by the content of the entry A1 of the input/output configuration information area 214 to derive the identifier of the channel system corresponding to the input/output configuration information-1. Assuming that the channel system identifier is "1", the input/output process request is sent to the channel system 200.

The channel system 200 which controls the IOP-0 70 sends the sub-channel number designated by the LPAR2 and the address of the input/output configuration information area-1 216 to the IOP-1 70. The IOP-1 70 reads the input/output configuration information of the designated sub-channel from the input/output configuration information storage area-1 216, extracts one or more channel path IDs from the read input/output configuration information of the sub-channel and passes the extracted channel path ID to the path selection circuit 72. The path selection circuit 72 of the IOP-1 70 selects the available CHP by using the passed channel path ID, determines a path to one of the plurality of DEVs through the CHP belonging to the selected IOP-1 70 and starts the DEV to start the input/output operation for the intended DEV.

As described hereinabove, in the embodiment of FIG. 1, the two input/output configuration information allocated to the LPAR1 and the LPAR2 are independently provided and as many CHPs 60 and 80 as are addressable up to the maximum data width determined by the basic hardware architecture of the physical information processing system are provided for each of the channel systems 100 and 200 corresponding to the respective input/output configuration information so that the each of the LPAR1 and the LPAR2 may use the input/output channels up to the maximum data width (for example, 8 bits) of the channel path determined by the basic hardware architecture of the physical information processing system. As a result, the entire information processing system may concurrently access from the LPAR1 and the LPAR2 the input/output channels which is the twice of the maximum number of input/output channels determined by the basic hardware architecture of the information processing system. This is true when the three or more LPARs are used. By using three or more input/output configuration information and increasing the number of corresponding channel systems, the input/output channels which are triple or more of the maximum number of input/output channels determined by the basic hardware architecture can be accessed from the plurality of LPARs.

In the present embodiment, the extending system and the logical division system of the input/output channels which control on the main storage have been described although the extending system and the logical division system of the input/output channels which controls by the hardware logics may be implemented or the extending system and the logical division system of the input/output channels may be implemented by the combination of the both systems.

What is claimed is:

1. A method of connecting a plurality of input/output channels between a plurality of sub-channels of an information processing system having a virtual machine running on a physical machine under control of a hypervisor and a plurality of devices, said method comprising the steps of:

issuing from the hypervisor a command for setting configuration information defining a plurality of configuration structures between a plurality of groups of the input/output channels for the respective virtual machines and the devices, in a storage device;

enabling the virtual machines for said plurality of groups of the sub-channels after the issuance of the command; and acquiring configuration information containing the sub-channel corresponding to a designated device from the configuration information corresponding to one of the virtual machines based on the device designation contained in an input/output command from said one virtual machine, wherein the number of said input/output channels is more than a maximum number determined by the number of bits of an address field prepared for the input/output channel designated in the input/output command.

2. A connection method according to claim 1 further comprising the steps of:

searching the corresponding configuration information by using ID information of said one virtual machine which issued the input/output command in order to execute said step of acquiring the configuration information.

3. A method according claim 2 further comprising the step of:

issuing from the hypervisor another command for setting a plurality of configuration information defining a configuration between the sub-channels provided for the respective virtual machines and the devices after the issuance of the command for enabling the virtual machines.

4. A method according to claim 3 further comprising the step of:

executing the input/output operation designated by the input/output command based on the configuration information.

5. A method according claim 1 further comprising the step of:

searching the corresponding configuration information by using the ID information of said one virtual machine which issued the input/output command in order to execute said step of acquiring the configuration information.

6. A method according to claim 5 wherein the number of said input/output channels is at least double of a maximum number defined by the number of bits of an address field prepared for the input/output channel designated in the input/output command.

7. A method according to claim 6 further comprising the step of:

issuing from the hypervisor another command for setting a plurality of configuration information defining a configuration between the sub-channels provided for the respective virtual machines and the devices after the issuance of the command for enabling the virtual machines.

8. A method according to claim 7 further comprising the step of:

selecting one of a plurality of paths between the devices and the sub-channels based on a support and executing the input/output designated by the input/output command.

9. A method according to claim 1 wherein the number of said input/output channels is at least double of a maximum number defined by the number of bits of an address field prepared for the input/output channel designated in the input/output command.

10. A method according to claim 9 further comprising the step of:

issuing from the hypervisor another command for setting a plurality of configuration information defining a configuration between the sub-channels provided for the respective virtual machines and the devices after the issuance of the command for enabling the virtual machines.

11. An information processing system having a plurality of virtual machines, comprising:

a plurality of physical machines, a storage device including a hardware system area (HSA) and an area for hypervisor;

said plurality of virtual machines operating on said physical machines under control of the hypervisor generated in said storage device;

said hypervisor issuing a command for setting configuration information defining a plurality of configurations between a plurality of input/output channels for the respective virtual machines and a plurality of devices, in the storage device; and an information storage area provided in said hardware system area for holding a relation between a plurality of virtual machines and a plurality of groups of said plurality of input/output channels in correspondence with the configuration information distinguishably by virtual machine IDs in an input/output command issued from the virtual machine;

the configuration information containing the designation of said input/output channels corresponding to a designated device from the confirmation information corresponding to one of said virtual machines being imparted to the input/output channels of the virtual machines which issued the input/output command in order to determine a path from the sub-channel to the device based on the designation of the device contained in the input/output command from said one virtual machine and the virtual machine identification ID.

12. An information processing system according to claim 11 wherein said virtual machines are enabled after the issuance of the set command and before the issuance of the input/output command.

13. In an information processing apparatus including at least a physical instruction processor, a main storage, input/output channels input/output processors for controlling said input/output channels, input/output devices connected to said input/output channels and a server processor, wherein a plurality of virtual machines run under control of a control program, a method of connecting a plurality of input/output channels and devices, comprising the steps of:

preparing a plurality of input/output configuration information having correspondence relation between a plurality of input/output channels and input/output devices;

constructing a plurality of channel systems each of which includes an input/output processor and a plurality of input/output channels and relates each of said input/output processors with each of a plurality of groups of said plurality input/output channels in correspondence to said configuration information, wherein each of said plurality of input/output processors has a maximum of input/output devices connectable thereto based on hardware architecture of a physical machine; and     relating a plurality of virtual machines to a plurality of groups of said plurality of input/output channels of said configuration information, respectively to enable operation of input/output channels of said plurality of groups of said plurality of input/output processors in parallel.

14. A method according to claim 13, further comprising step of:

enabling said plurality of virtual machines for said plurality of groups of said plurality of input/output channels issuing an input/output command.

\* \* \* \* \*